No. 783,479. PATENTED FEB. 28, 1905.
E. M. SWANSON.
CULTIVATOR.
APPLICATION FILED JUNE 8, 1904.

2 SHEETS—SHEET 1.

Witnesses
T. P. Glow
H. C. Rodgers

Inventor
Elmer M. Swanson
By George H. Thorpe
Atty.

No. 783,479. PATENTED FEB. 28, 1905.
E. M. SWANSON.
CULTIVATOR.
APPLICATION FILED JUNE 8, 1904.

2 SHEETS—SHEET 2.

Witnesses
F. R. Glue
H. C. Rodgers

Inventor
Elmer M. Swanson
By George J. Thorpe
Atty

No. 783,479. Patented February 28, 1905.

UNITED STATES PATENT OFFICE.

ELMER M. SWANSON, OF BLUE RAPIDS, KANSAS.

CULTIVATOR.

SPECIFICATION forming part of Letters Patent No. 783,479, dated February 28, 1905.

Application filed June 8, 1904. Serial No. 211,682.

*To all whom it may concern:*

Be it known that I, ELMER M. SWANSON, a citizen of the United States, residing at Blue Rapids, in the county of Marshall and State of Kansas, have invented certain new and useful Improvements in Cultivators, of which the following is a specification.

This invention relates to cultivators, and has for its object to produce certain improvements in the mechanism of each gang, whereby the draft shall tend to hold the cultivating appliances in the ground at their full depth.

A further object is to produce means whereby the cultivating appliances can be locked in their raised or inoperative position, so that the draft on the machine shall be utilized solely for its propulsion.

A still further object is to produce a machine of the character outlined which is of suitable, strong, durable, and inexpensive construction.

To these ends and others, as hereinafter appear, the invention consists in certain novel and peculiar features of construction and organization, as hereinafter described and claimed, and in order that it may be fully understood reference is to be had to the accompanying drawings, in which—

Figure 1:
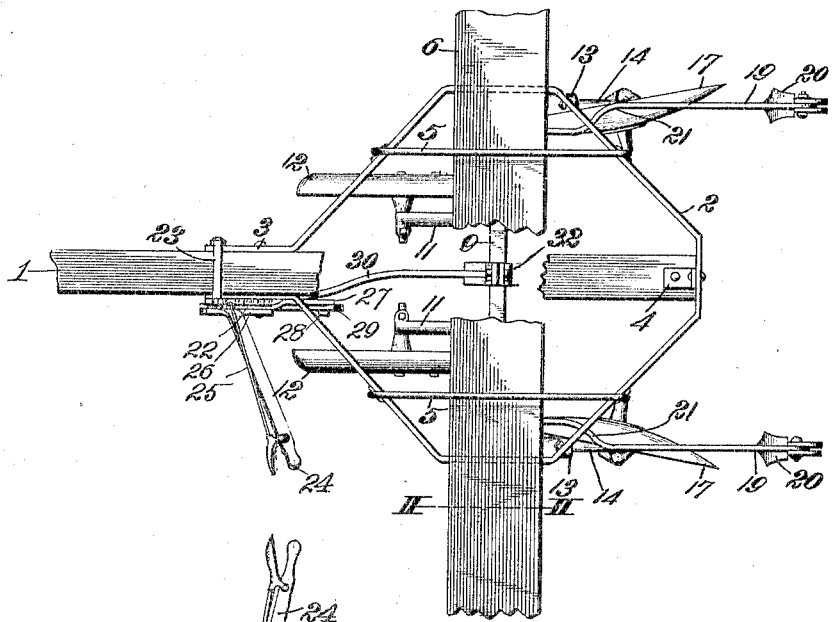
Figure 2:
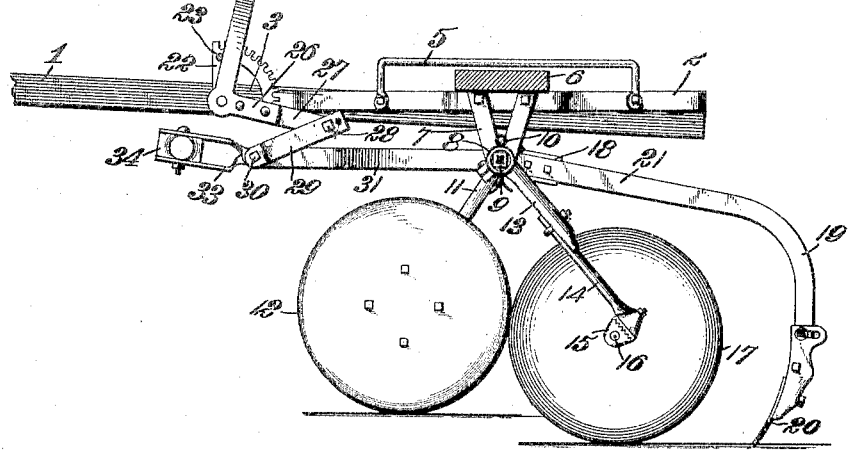
Figure 3:
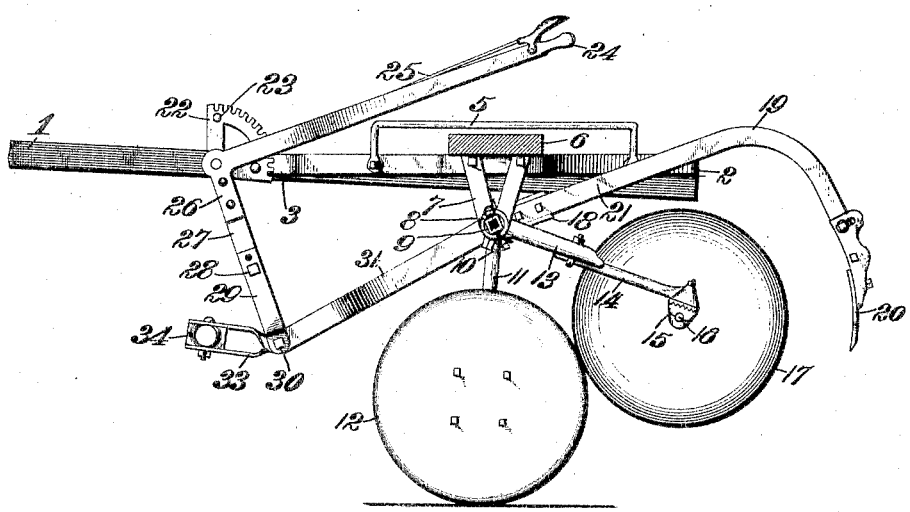
Figure 4:
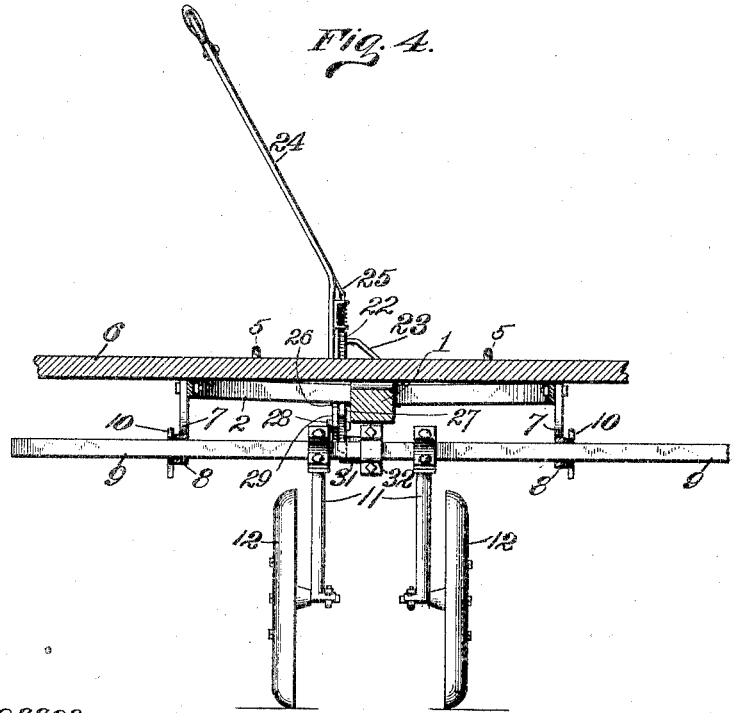

Figure 1 represents a plan view of one gang of a straddle-row cultivator, a portion of the connecting-plank (broken away) being also shown. Fig. 2 is a vertical section taken on the line II II of Fig. 1 and showing the cultivating appliances in operative position. Fig. 3 is a view similar to Fig. 2, but with the cultivating appliances occupying their inoperative position. Fig. 4 is a vertical transverse section in the plane of the rock-shaft.

Referring to the drawings in detail, where like reference characters designate corresponding parts in all the figures, 1 designates the tongue, and 2 a skeleton frame occupying approximately a horizontal plane and of substantially diamond shape with the corners cut away, and said frame is formed of a single bar bent to the shape shown clearly in Fig. 1 with its rear portion overlying the tongue and its front portion terminating in parallel arms 3, bolted to the sides of the tongue, the rear portion being bolted to a bracket 4, secured to the tongue.

5 designates parallel arches which extend longitudinally of the machine at suitable distances from the tongue and are secured rigidly to said frame for the purpose of holding the seat-plank 6 down upon the latter while permitting the usual pivotal and longitudinal movement of said plank.

7 designates brackets bolted to the side portions of the frame and depending therefrom and formed at their lower ends with circular eyes 8 as journals for the hollow rectangular rock-shaft 9, said rock-shaft being provided with spring-cotters 10 close to the brackets, so as to prevent longitudinal movement of the shaft.

11 designates ground-wheel arms secured rigidly at their upper ends in any suitable manner to the rock-shaft and equipped at their lower ends with the customary ground-wheels 12. 13 designates arms secured rigidly at their upper ends to said shaft and diverging rearwardly with respect to arms 11, and 14 designates arms longitudinally and rotatably adjustable in arms 13 in a well-known manner and bolted at their rear ends to castings 15, equipped with shafts 16, on which are journaled and secured in any suitable manner cultivating-disks 17.

18 designates castings secured rigidly on the rock-shaft and carrying in any suitable manner the beams 19, equipped with the customary plows or shovels 20, and in order that said plows may be disposed centrally behind the disks they are bent laterally, as at 21. By thus bending these beams it is obvious that they can be disposed as shown in Fig. 1 when cultivating the field the first time—that is, when the plants are young. On the second cultivating operation, when the plants are older and the disks are therefore disposed farther apart to turn the soil inward instead of outward, as in Fig. 1, the beams are reversed, so that their bent portions will diverge rearwardly and inwardly instead of rearwardly and outwardly, as shown, this reversing being accomplished by removing them and placing the one formerly occupying the right-hand side of the machine on the left and the one formerly occupying the left-hand side on the right. By so doing it will be apparent that the shovels can be caused to follow directly in line with the disks at all times, it being understood, of course, that when the beams are reversed their castings 18 are disposed outward upon the rock-shaft of arms 13 instead of inward, as shown in Fig. 1. This adjustment of the disk-arms and plow-beams, however, is common in this class of machines and need not be further dwelt upon.

22 designates a notched sector secured to the inner arm 3 of the frame, the inner arm being that nearest the driver, and secured, by preference, by the same bolts which secure the arms 3 to the tongue, and 23 designates an inclined brace which extends from the foremost of said bolts at the right-hand side of the tongue to the sector.

24 designates a lever mounted on the bolt forming the axis of the sector and provided with the usual latch mechanism 25 to lock the lever at the desired point of adjustment with relation to the sector, and said lever bends inwardly, as shown, to within convenient reach of the driver. The lever is provided with a foot portion 26, and bolted rigidly to said portion is an arm 27, pivotally connected, as at 28, to the upper end of a link 29, which link is bent inwardly at its lower end, so as to underlie the tongue, and at such end it is pivoted, as at 30, to a bar 31, which forms alternately a stub-tongue and a lever, the rear end of the bar being rigidly secured to the rock-shaft, as at 32, or in any other suitable manner.

33 is a clevis pivoted, as at 30, to the forward end of bar 31 and equipped with the doubletree 34, to which the draft-animals are hitched in the customary manner.

When the machine is traveling to and from the field, and therefore not performing its cultivating function, lever 24 is depressed, the depression of said lever throwing bars 27 and 29 in alinement and causing bar 31 to act as a lever and operate the rock-shaft downwardly and rearwardly, which action raises the cultivating appliances and rolls the ground-wheels to a position approximately vertically below the rock-shaft in order that the machine may travel with a minimum of friction, the latch mechanism holding said parts in the position described.

When the cultivating operation is to begin, the driver trips the latch mechanism and instantly the weight of the parts coöperates with the draft on the clevis and the forward push upon the lever by the driver in lowering the cultivating appliances to operative position and swinging the ground-wheels forward a sufficient distance to impose most of the weight of the machine and the driver upon the cultivating appliances.

If it is desired to cultivate as deep as possible, the driver in any suitable manner holds the latch mechanism out of engagement with the sector, and in consequence the draft is imposed on bar 31 slightly upward of the line of its length, the result being the draft alone is sufficient to hold the cultivating appliances as deeply embedded as it is possible to force them. The machine with the parts thus disposed crosses ditches in a flexed condition, and consequently no injury results to the plow-beams when dropping into the ditches, as only a yielding resistance is opposed to their upward movement in contradistinction to the unyielding resistance which is offered when the lever is latched.

When it is desired that the cultivating appliances shall operate at less than their full depth—for instance, when cultivating the first time over or when the condition of the soil dictates the advisability of such shallow cultivation—the driver latches the lever at the proper point of adjustment on the sector.

When it is desired to elevate the cultivating appliances, the team is stopped, so as to eliminate the draft as a resistance to such elevating action, making it necessary for the driver to only raise the usual weight.

From the above description it will be apparent that I have produced a cultivator embodying the features of advantage enumerated as desirable in the statement of invention, and while I have illustrated and described the preferred embodiment of the same it is to be understood that I reserve the right to make such changes in the form, proportion, detail construction, and arrangement of the parts as shall not be a departure from its spirit and scope or sacrifice any of its advantages.

Having thus described the invention, what I claim as new, and desire to secure by Letters Patent, is—

1. In a cultivator, a tongue, a frame secured thereto, brackets carried by the frame, a rock-shaft journaled in the brackets and equipped with rigid ground-wheel-carrying arms and cultivating appliances, a bar projecting rigidly from the rock-shaft and underlying the tongue, a lever suitably mounted and provided with an arm projecting at an angle to the body portion of the lever, and a link pivotally connecting said arm with the front end of the bar rigidly secured on the rock-shaft.

2. In a cultivator, a tongue, a frame thereon, brackets carried by the frame, a rock-shaft journaled in the brackets and rigidly equipped with ground-wheel-carrying arms and cultivating appliances, a bar projecting rigidly from the rock-shaft, means for swinging said bar downward to simultaneously roll the ground-wheels rearward and elevate the cultivating appliances, and means for hitching the draft-animals to said bar.

3. In a cultivator, a tongue, a frame thereon, brackets carried by the frame, a rock-shaft journaled in the brackets and rigidly equipped with ground-wheel-carrying arms and cultivating appliances, a bar projecting rigidly from the rock-shaft, means for swinging said bar downward to simultaneously roll the ground-wheels rearward and elevate the cultivating appliances, means for securing said bar at the desired position of adjustment, and means for hitching the draft-animals to said bar.

4. In a cultivator, a tongue, a frame secured thereto, brackets depending from the frame, a rock-shaft journaled in the brackets and rigidly equipped with ground-wheel-carrying arms and cultivating appliances, a bar rigidly carried by and projecting forwardly from the rock-shaft, a clevis pivotally connected to the front end of said bar, a notched sector secured to the front end of said frame, a lever journaled axially of the sector, and provided with a latch mechanism for engagement with the sector, an arm projecting from the lever, and a link pivotally connecting said arm with said bar.

In testimony whereof I affix my signature in the presence of two witnesses.

ELMER M. SWANSON.

Witnesses:
CARL L. SWANSON,
R. H. SWANSON.